July 13, 1937. R. S. THOMPSON 2,087,223
FAUCET
Filed April 28, 1936 2 Sheets-Sheet 1
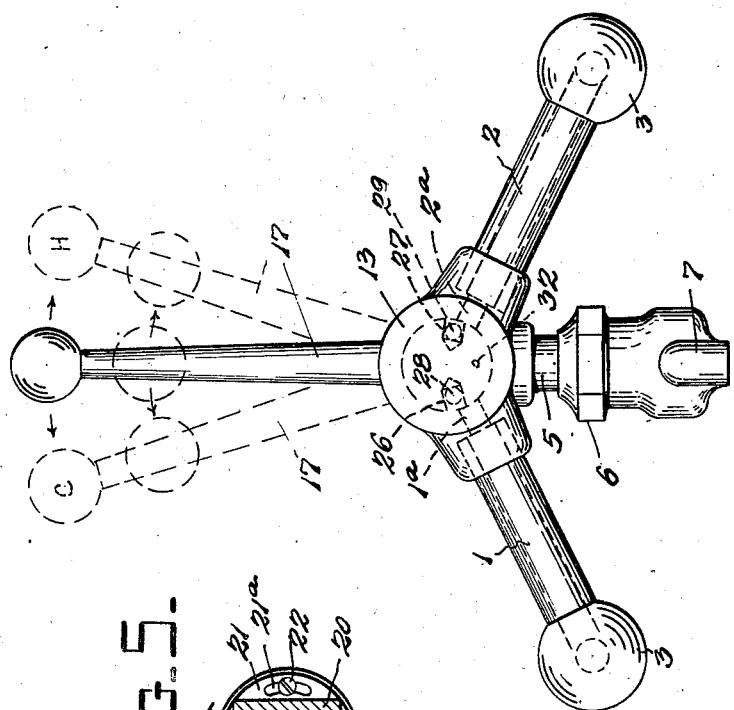
Fig.2.
Fig.5.
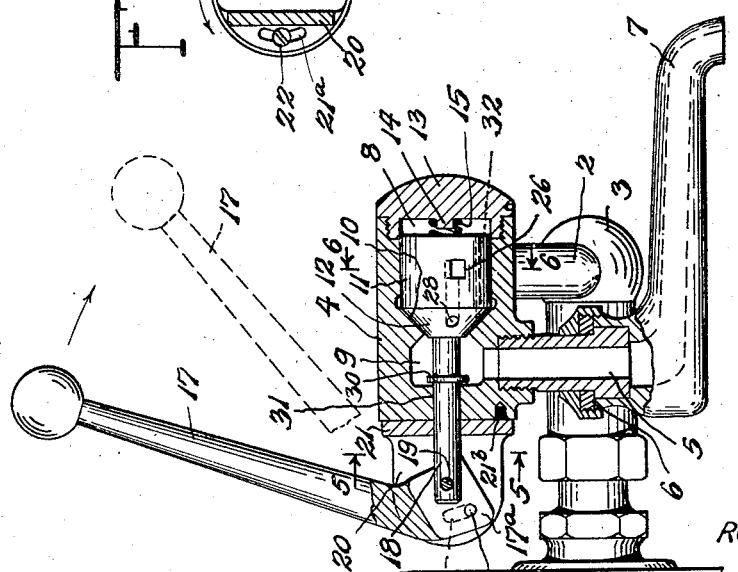
Fig.1.
Inventor
ROY S. THOMPSON.
By Robbs Cobb
Attorneys July 13, 1937.  R. S. THOMPSON  2,087,223
FAUCET
Filed April 28, 1936  2 Sheets-Sheet 2
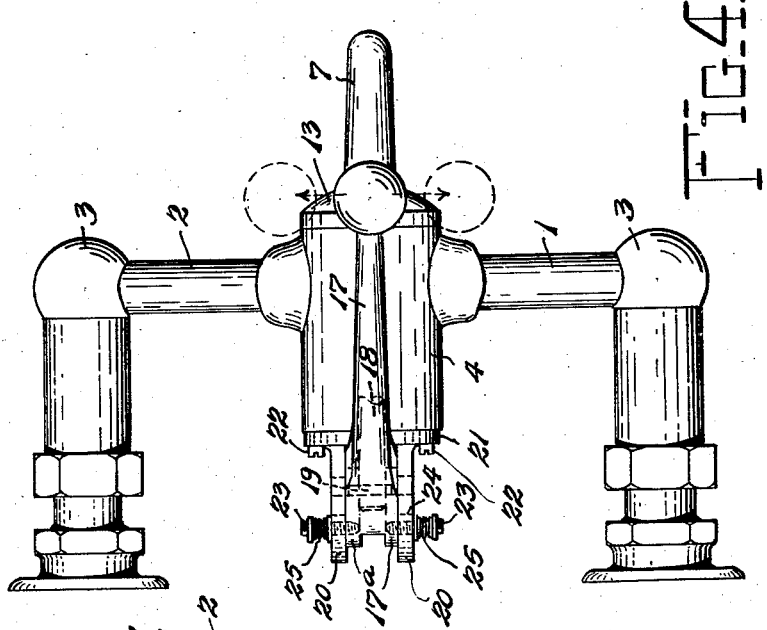
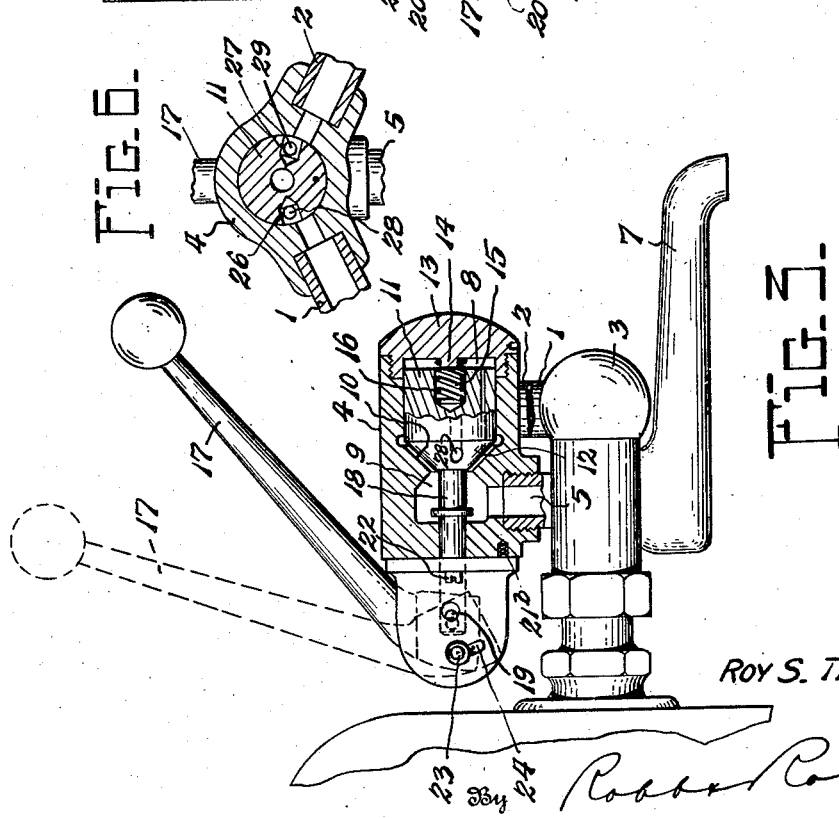
Inventor
ROY S. THOMPSON.
By Robert Cobb
Attorneys Patented July 13, 1937

2,087,223

UNITED STATES PATENT OFFICE 2,087,223

FAUCET

Roy S. Thompson, Bay Village, Ohio

Application April 28, 1936, Serial No. 76,838

7 Claims. (Cl. 277—24)

This invention has to do with faucets for washbasins, sinks and similar places of use of such devices, and the invention resides primarily in a combination sink valve hot and cold water faucet of relatively simple construction, and exceedingly flexible in regard to the actuation and adjustment of the valve means. In reference to the simplicity of my construction, it is noted that I avail of a single operating lever or handle for the actuation of the valve whereby to turn on the water and to obtain a desired mixture of hot and cold water.

My operating handle or lever is so connected with the valve which, as stated, is of single construction, that by a slight movement in one direction the water or liquid may be turned on in the faucet, and by further movements in opposite other directions the relative quantities of hot and cold water may be varied at will. Practically speaking, the operating handle instrumentality and mode of connection with the valve permits of simultaneous actuation of the valve to turn on the water and adjustment for the mixture of the proper relative quantities of hot and cold water desired.

The invention involves certain details of construction including the mounting of the operating handle or lever for valve actuation purposes, whereby ease of operation of the valve is secured, and including further a special form of valve and casing structure, the latter of which carries the operating lever or handle, all formed and arranged so as to obtain an exceeding simplicity of construction throughout the mechanism of the faucet.

In the accompanying drawings I have illustrated one type of construction of valve embodying a preferred form of the invention. The figures of the drawings are described as follows:—

Figure 1 is a central vertical sectional view of a faucet embodying the invention, the spout member, however, illustrated largely in full lines, as well as the body of the operating handle or lever, the dotted line position of the handle indicating its range of movement for opening the valve.

Figure 2 is a front elevation of the complete faucet, dotted lines showing the mode of laterally shifting the handle to regulate the relative quantities of hot and cold water supplied at the spout.

Figure 3 is a view somewhat similar to Figure 1, but showing the lever or handle in an actuated position as when the valve is open.

Figure 4 is a top plan view of the complete faucet.

Figure 5 is a sectional view of a portion of the faucet, the section being taken at lines 5—5 in Figure 1.

Figure 6 is a sectional view of a portion of the faucet, the view being taken on line 6—6 of Figure 1.

Describing the invention as illustrated in the drawings specifically, it is desired to point out that modifications in the contours and various shapes of the parts of the faucet may be availed of, depending upon the purpose for which the device is to be used and the degree of ornamentality of its appearance desired. Thus, for use in bathrooms and lavatories, the faucet will be preferably of more ornate external appearance than would be necessary when the device is used in basements or at washtubs, where its utility is equally as great as when used elsewhere.

As seen in Figure 2, the faucet comprises primarily branch pipes 1 and 2 adapted to be connected with the hot and cold water outlets at their outer extremities as at 3. The pipes 1 and 2 are joined at their adjacent ends to a valve casing 4 and leading down from the casing 4 is a vertical outlet pipe 5, with which is swivelly connected at 6, in a well known manner, the faucet spout 7. The member 7 may be swung horizontally to direct the flow of water passing therethrough and out of the faucet, as obvious to persons acquainted with the use of these devices.

Reverting to the construction of the valve casing 4, it is notable that the same is divided into an intake chamber 8 and an outflow chamber 9, between which chambers is located the tapered valve seat 10. A sliding valve 11 is disposed to move longitudinally within the chamber 8 toward and from the valve seat 10, and said valve is equipped with a tapering closure portion 12 adapted to be seated against the seat 10 when the valve is closed to cut off the supply of water to the member 7. The front end of the casing 4 is equipped with a removable closure member 13 by which access may be had to the chamber 8 and the valve 11 therein, said member 13 having a central lug 14 to engage one end of a coiled spring 15 which extends inwardly from the closure member 13 to a recess 16 in the front end of the valve 11. The purpose of the spring 15 is to exert a light spring pressure tending to hold the valve 11 seated against the seat 10, but not sufficient pressure to interfere with the free movement of the valve under actuation by its handle 17.

The valve 11 will have a close but free moving fit against the walls of the chamber 8, and inwardly from the valve there projects an actuating stem 18 which passes through the rear end of the casing 4 and is connected by a pivot pin 19 with the handle or lever 17 previously mentioned. The handle or lever 17 is bifurcated preferably, so as to receive between the bifurcations 17a thereof the flattened rear end of the stem 18. Said handle 17, moreover, is rockably mounted upon the spaced supporting arms or ears 20 of a rotative supporting plate 21 provided with slots 21a cooperating with screws or any suitable members 22 for rotatively attaching plate 21 to the rear end of the casing 4. The plate 21 and members 20 constitute together a rotative support for the handle 17, adapted to rotate in a plane at right angles to the valve stem 18 or axis of the valve 11. A spring 21b arranged between the plate 21 and the valve housing 4 is provided to frictionally engage plate 21 to hold the same in its various positions of adjustment.

The mounting between the handle 17 and the spaced arms 20 between which the lower end of the handle is arranged, is peculiar and involves a camming arrangement provided by pins or screws 23 which pass through arcuate shaped slots 24 in the parts 20. The pins or screws 23, after being passed in the slots 24, are screwed in suitable openings in the bifurcations 17a of the member 17 and thus form supports for the said member 17.

If desired, the parts 23 may have springs 25 interposed between the heads thereof and the outer faces of the arms 20, which springs create slight friction working in conjunction with washers directly contacting the parts 20, and which friction is desirable simply to hold the handle or lever 17 in a position of adjustment within its range of movement forwardly of the faucet.

The slots 24 are formed on an arc which is eccentric in relation to the axis of the pin or pivot connection 19 between the stem 18 and the lower end of the lever 17 comprising the bifurcations 17a. On this account when the lever 17 is moved forwardly in the direction of the arrow in Figure 1, a slight camming effect is produced as the lever pivots about the axis 19, due to the arrangement of the slots 24, and in this way the valve 11 is moved forwardly to unseat the same from the seat 10, as shown best in Figure 3, wherein the valve is in open position.

In a measure it may be said, therefore, that the construction above described provides a sort of universal mounting for the handle or lever member 17, in that the latter may be shifted laterally about an axis longitudinally of the valve 11, and forwardly in a plane passing through the axis of the valve, and with combinations of such forward and lateral movements within a predetermined range as prescribed by the length of the slots 24 and the degree of longitudinal movement of the valve 11 with its stem 18.

The provisions for the passage of water or liquid from the pipes 1 and 2 to the spout member 7 through the pipe 5 include ports 1a and 2a passing through the walls of the casing 4 at opposite sides thereof. These ports 1a and 2a register with valve ports 26 and 27 formed transverse to the axis of the valve 11 and about the same size as the ports 1a and 2a, respectively. From the ports 26 and 27 of the valve 11 lead the valve passage 28 for the port 26, and the valve passage 29 for the port 27, which passages extend to and through the tapered end 12 of the valve 11. The ports 26 and 27 may be preferably of square configuration to permit a gradual adjustment of the amounts of different fluids relative to each other.

There may be employed a shoulder 30 on the stem 18, of a diameter smaller than the diameter of the opening at the smallest portion of the seat 10. The shoulder 30 is adapted to divert the stream of fluid away from the opening 31 in which stem 18 is movably arranged in a fluid-tight manner to eliminate any possibility of leakage at this point. Also, there is provided, as seen in Figure 1, a bleed opening or passage 32, extending longitudinally through the valve 11 from its outer end to its inner end. The said bleed opening 32 prevents the trapping of air or water at the outer end of the chamber 8 at one end of the valve 11, in a self-evident manner.

With the foregoing description of the construction of my faucet, its operation may be briefly set forth. It should be borne in mind that the valve and its stem 18 are susceptible of rotary movement by the rotation of the supporting member 20—21 and are likewise susceptible of longitudinal movement through the actuation of the lever 17 in a forward or rearward direction. The rotary movement of the valve and its stem is compelled by the actuation of the parts 20—21.

It will be assumed that the valve 11 is positioned in the manner shown in Figure 2, with its ports 26 and 27 normally partially in register with the ports 1a and 2a, respectively. By pulling forwardly on the handle 17, the valve 11 is unseated from the seat 10, as seen in Figure 3, and hot and cold water or liquid supplied from the pipes 1 and 2 will simultaneously pass to the outflow chamber 9 and off through the spout 7. If, however, before moving the handle 17 forwardly, or after moving it forwardly, it is swung to the right, as seen in Figure 2, the degree of swinging will control the amount of closing of the port 26 and the extent of additional opening of the port 27 so that a greater amount of water from the pipe 2 will flow to the chamber 9 than that passing from pipe 1 to said chamber, and if the handle 17 is adjusted to the limit of its rightward movement, the port 26 will be totally closed and the port 27 will be fully open and liquid from the pipe 2 only will pass to chamber 9. Obviously, the reverse action of moving the lever or handle 17 to the left, as seen in Figure 2, will correspondingly control the extent of increase of the quantity of the liquid which passes from the pipe 1 to the chamber 9, until the handle 17 reaches its leftward limit of movement, whereupon the port 27 will be totally closed and the port 26 fully open for the passage of the liquid supplied at the pipe 1.

By reason of the mounting of the member 17 and the fact that it may be pulled forwardly, as one adjustment, to any desired degree to vary the quantity of liquid passing from the spout 7, and the fact that said handle may be swung to the right or left either before or after its movement forwardly, there is afforded a flexibility in the control of the passage of the fluids from the pipes 1 and 2 through the valve casing, which is highly advantageous under practical conditions of service, as will be obvious to those versed in this particular art. Because of the foregoing flexibility of operation, the handle 17, while the valve 11 is closed, may be adjusted to immediately give greater or less flow of hot water before it is opened by its forward movement, and correspongingly a greater or less flow of cold water before it is opened. Or, the lever 17 may be adjusted to a greater or less extent forwardly for a greater or less opening of the valve to supply equal quantities of the fluids entering the casing from the pipes 1 and 2, and, thereafter, lateral shifting of the lever will vary the relative quantities within the widest possible range that could be desired.

Having thus described my invention, what I claim as new and desire to secure by Letters Patent of the United States, is—

1. In a faucet of the class described, in combination, a valve casing having separate ports communicating with the interior thereof and also provided with a valve seat therein, a valve mounted in said casing and having an end thereof adapted to seat against said valve seat to close against the latter, said valve being provided with ports to register with the ports of the casing to a greater or less extent both by rotary and sliding movement of the valve, said valve additionally being provided with outflow passages leading from its said ports to the end of the valve adapted to engage the valve seat of the casing, corresponding ends of said passages being closed when the valve end aforesaid is seated against the valve seat, and handle means for controlling and effecting rotative and sliding movements of the valve, the rotating movements to control the effective areas of the valve ports of the valve and the sliding movement to cause unseating of the valve and permit fluid to pass through the valve passages aforesaid for outflow purposes.

2. In a faucet, in combination, a valve casing formed to provide an inlet chamber and an outflow chamber and provided intermediate said chambers with a valve seat, a valve mounted in the inlet chamber and having one end thereof adapted to seat against the valve seat, said casing having a valve port leading into the inlet chamber, said valve having a valve port adapted to register and to be moved with the valve out of register respecting the port of the casing, an outflow passage leading from the port of the valve to the end thereof adapted to seat against said valve seat and when said valve end is so seated to be closed by the valve seat, and handle means for moving the valve to unseat it from the valve seat and for imparting a separate movement to the valve to control the registration and non-registration of the port of the valve with the port of the casing.

3. A faucet as set forth in claim 2, combined with mounting means intermediate the casing and the handle means, permitting the handle to shift the valve slidably to unseat it from the valve seat and shift the valve rotatively to control the registration of its port with the port of the casing, said mounting means including a member rotatively mounted on the valve casing, means for pivotally connecting the handle means with the valve, said rotatively mounted member having at least one slot therein eccentrically related to the axis of pivotal connection between the handle means and valve, and a pin carried by the handle means and projecting into and freely shiftable in said slot, whereby to produce a camming action on the valve in a longitudinal direction respecting the valve, responsive to pivotal movement of the handle means about its pivotal connection aforesaid with the valve.

4. A faucet as set forth in claim 2, combined with mounting means intermediate the casing and the handle means, permitting the handle to shift the valve slidably to unseat it from the valve seat and shift the valve rotatively to control the registration of its port with the port of the casing, said mounting means including a pivotal connection between the same and the casing and a cam connection between the same and the handle means permitting universal movement of the handle means relatively to the casing, and a pivotal connection between the handle means and the valve for effecting the movement of the valve as stated.

5. In a faucet, in combination, a valve casing having a fluid admission port therein, a valve slidably and rotatively mounted in said casing, a valve seat in the casing against which the valve may normally seat, said valve having a port to register and to be moved out of registration with the port of the casing, and further provided with an outflow passage leading from said port of the valve to the parts of the valve adapted to cooperate with the valve seat and to be closed by said valve seat when the valve is against said seat, and handle means for imparting to the valve sliding and rotative movements for the purpose set forth.

6. A faucet as set forth in claim 5, the valve of which is provided with a valve stem leading through a portion of the casing, the handle means being pivotally connected with the stem of the valve, together with mounting means between the casing and the handle means affording movement of the handle means in at least two planes for causing unseating or opening action of the valve when the handle means is moved in one plane and for rotating the same to control the registration of its port with the port of the casing when the handle means is moved in another plane.

7. In a faucet, a valve casing having a valve seat therein, a valve mounted in the casing for both rotatable and slidable movements, and adapted by slidable movement to move away from its seat, the casing and valve being provided with registrable ports and the valve having an outflow passage leading from its port to a portion thereof adapted to seat against said seat, said passage being closed when the valve is seated against said seat, a handle pivotally connected with the valve, and a camming connection between said valve casing and the handle for causing shifting of the valve upon movement of the handle relatively to the casing, said camming connection including mounting means between the handle and casing providing a rotatable connection or support for the handle on the casing and permitting the rocking of the handle about the pivotal connection between the same and the valve for the purpose set forth.

ROY S. THOMPSON.